US010421057B2

(12) United States Patent
Richet et al.

(10) Patent No.: US 10,421,057 B2
(45) Date of Patent: Sep. 24, 2019

(54) REFORMING TUBE COMPRISING AN INSERT AFFORDING PROTECTION AGAINST CORROSION

(71) Applicant: L'Air Liquide, Société Anonyme pour l'Etude et l'Exploitation des Procédés Georges Claude, Paris (FR)

(72) Inventors: Nicolas Richet, Fontenay-le-Fleury (FR); Hans Werner Scholz, Bad Nauheim (DE)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 0 days.

(21) Appl. No.: 15/751,352

(22) PCT Filed: Aug. 11, 2016

(86) PCT No.: PCT/EP2016/069106
§ 371 (c)(1),
(2) Date: Feb. 8, 2018

(87) PCT Pub. No.: WO2017/025587
PCT Pub. Date: Feb. 16, 2017

(65) Prior Publication Data
US 2018/0229206 A1  Aug. 16, 2018

(30) Foreign Application Priority Data
Aug. 12, 2015 (EP) .................................. 15180784

(51) Int. Cl.
B01J 19/02 (2006.01)
F16L 58/08 (2006.01)
(Continued)

(52) U.S. Cl.
CPC ........... *B01J 19/02* (2013.01); *B01J 19/0066* (2013.01); *B01J 19/2415* (2013.01); *F16L 58/08* (2013.01);
(Continued)

(58) Field of Classification Search
CPC .... B01J 19/02; B01J 19/0066; B01J 19/2415; F16L 58/08; F16L 58/14
(Continued)

(56) References Cited

U.S. PATENT DOCUMENTS 3,570,545 A * 3/1971 Benteler ................... F16L 9/21
138/143
4,122,894 A * 10/1978 Laws ....................... F28F 9/06
165/175
(Continued)

FOREIGN PATENT DOCUMENTS

FR    2 987 878       9/2013
WO    WO 00 50663    8/2000

OTHER PUBLICATIONS

European Search Report for corresponding EP 15180784, dated Mar. 8, 2016.
(Continued)

Primary Examiner — Huy Tram Nguyen
(74) Attorney, Agent, or Firm — Elwood L. Haynes

(57) ABSTRACT

A reforming tube including a cavity emerging on either side of the tube, an external wall, an internal wall, a protection element for protecting against corrosion inserted into the cavity mirroring at least a portion of the internal wall, a space between the internal wall and the protective part, and a refractory material which fills in the space between the internal wall and the protection element.

11 Claims, 3 Drawing Sheets

(51) Int. Cl.
*B01J 19/00* (2006.01)
*B01J 19/24* (2006.01)
*F16L 58/14* (2006.01)

(52) U.S. Cl.
CPC ....... *F16L 58/14* (2013.01); *B01J 2219/0218* (2013.01); *B01J 2219/0236* (2013.01)

(58) Field of Classification Search
USPC .......................................................... 422/241
See application file for complete search history.

(56) References Cited

U.S. PATENT DOCUMENTS

| | | | | |
|---|---|---|---|---|
| 4,176,612 | A | * | 12/1979 | Speer ....................... F23J 13/00 110/323 |
| 4,449,575 | A | * | 5/1984 | Laws ...................... F28D 13/00 165/158 |
| 4,690,690 | A | | 9/1987 | Andrew et al. |
| 5,775,269 | A | * | 7/1998 | Lawrence ............... F22B 37/08 122/511 |
| 8,424,591 | B2 | | 4/2013 | Creed et al. |
| 2001/0033060 | A1 | | 10/2001 | White et al. |
| 2013/0019986 | A1 | | 1/2013 | Dorsch et al. |
| 2015/0048575 | A1 | * | 2/2015 | Lebain ................ B01J 19/0073 277/627 |

OTHER PUBLICATIONS

International Search Report for corresponding PCT/EP2016/069106, dated Oct. 28, 2016.

\* cited by examiner

REFORMING TUBE COMPRISING AN INSERT AFFORDING PROTECTION AGAINST CORROSION

CROSS REFERENCE TO RELATED APPLICATIONS

This application is a 371 of International Application PCT/EP2016/069106 filed Aug. 11, 2016, which claims priority to European Patent Application EP 15180784.9 filed Aug. 12, 2015, the entire contents of which are incorporated herein by reference.

BACKGROUND

A subject matter of the present invention is a reforming tube comprising a means which makes it possible to prevent, in its cavity, the corrosion phenomenon known as metal dusting. Metal dusting is understood to mean a catastrophic disintegration of the metals (Fe, Ni, Co) observed in carburizing atmospheres of chemical and petrochemical processes.

This rapid and local corrosion can result in problems within the reforming process, in particular safety problems.

Today, the mechanisms of this corrosion are not well understood and it appears that numerous parameters have an influence: the chemical composition of the alloy, the size of the grains, the residual stresses, the finishing of the surface, the pressure of the process, the composition of the atmosphere, and the like, and it is difficult to evaluate the intrinsic contribution of each parameter and their interactions.

Over many years, researchers have developed several barriers for preventing this corrosion phenomenon known as metal dusting.

Among the solutions developed, the most important is the aluminizing of the alloy. This consists in reacting aluminum vapor with the alloy in order to form an aluminum-rich exterior layer. The chemical composition of the coating can vary according to the alloy. For example, if an alloy based on Cr—Ni is considered, the exterior layer will contain Al, Ni and Cr.

More recently, researchers have developed a novel coating formulation with the objective of preventing the formation of carbon from the atmosphere. It is known today, for example, that nickel can catalyze the formation of carbon from a cementation atmosphere and that this is the first stage of the mechanism of the metal dusting phenomenon. By using an exterior layer which does not catalyze the formation of carbon, the formation of carbon and thus the corrosion phenomenon known as metal dusting are thus prevented. Tin-comprising coatings have been developed and appear to perform well.

Composite tubes are another solution for reducing corrosion. This solution is based on the assembling of two materials having dissimilar properties. Usually, one material will exhibit a high resistance to corrosion under the conditions of the process while the other will exhibit elevated mechanical properties. The two materials, usually alloys, are welded together using different manufacturing processes. This results in two layers of materials having different thicknesses according to the specifications of the process. The main difficulty is to produce complex shapes and the problem of thermal expansion, resulting in stresses which might increase the rate of corrosion or reduce the mechanical strength.

Taking this as the starting point, the first limitation of the existing solutions with regard to the corrosion phenomenon known as metal dusting is the size of the parts to be protected. For example, if the tubes used for the reforming of methane are considered, these tubes are approximately 13 m in length and it is difficult to find firms which have the appropriate equipment for producing a homogeneous (thickness and chemical composition) coating. In addition, it is difficult to produce the coating on small sections of tube, before welding them together in order to obtain the final length, due to the low welding capability of coatings made of aluminum on small sections.

The configuration of the parts to be protected can also reduce the choice in terms of coating techniques and chemical composition of the coating.

Another of the problems encountered is the difference in expansion behavior between the alloy of the reforming tube and the coating, which might result in cracks.

Consequently, it is a matter of finding a reforming tube which exhibits a new improved means making it possible to prevent, in its cavity, the corrosion phenomenon known as metal dusting.

SUMMARY

A reforming tube is presented. The reforming tube comprises a cavity emerging on either side of the tube, an external wall, an internal wall, a protection element for protecting against corrosion inserted into the cavity mirroring at least a portion of the internal wall, a space between the internal wall and the protective part, and a refractory material which fills in said space between the internal wall and the protection element.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1:
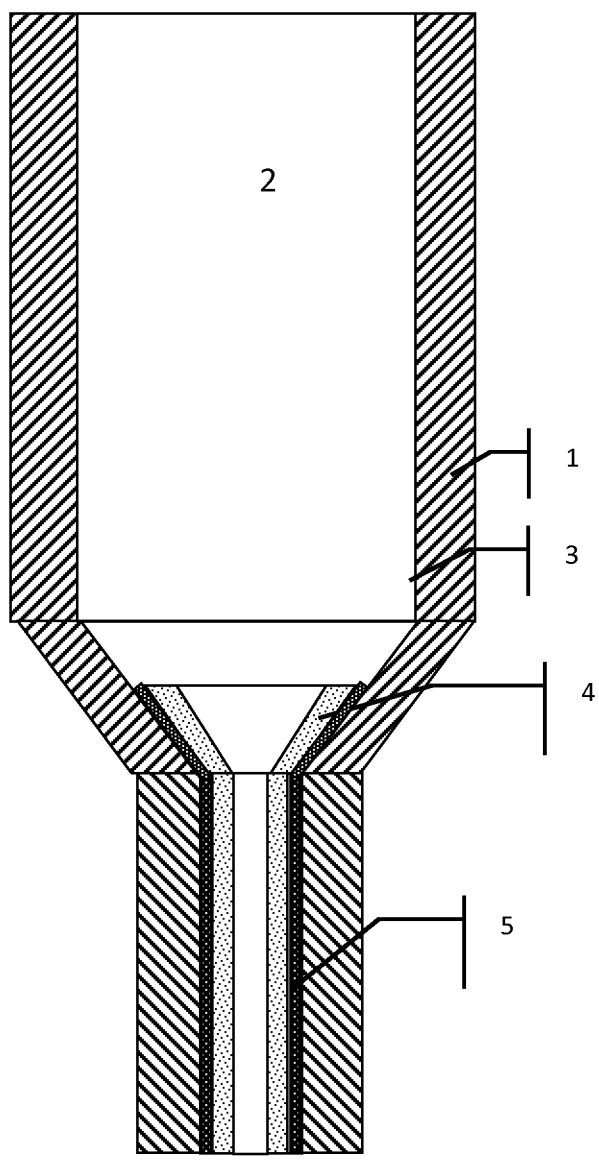
FIG. 1 illustrates one embodiment of the present invention.
Figure 2:
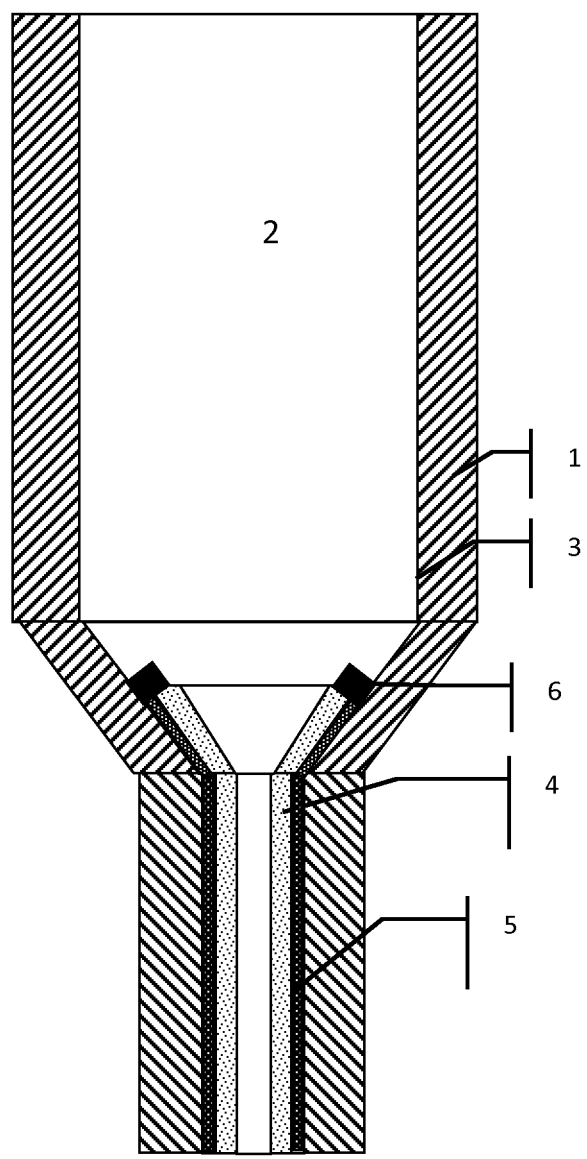
FIG. 2 illustrates another embodiment of the present invention, illustrating a joint between the upper end of the protective part and the internal wall.
Figure 3:
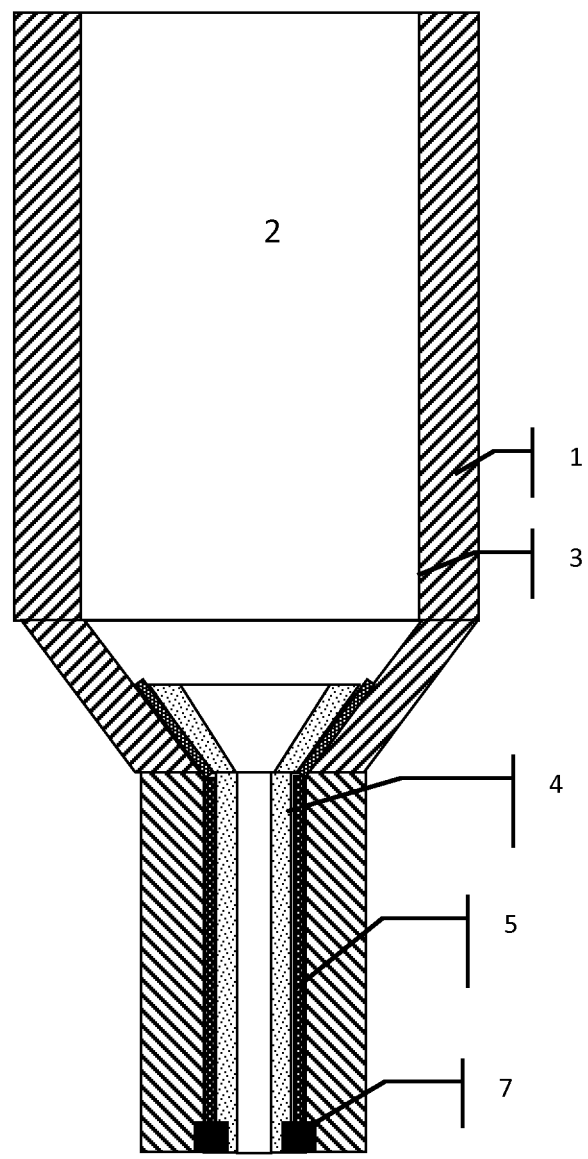
FIG. 3 illustrates another embodiment of the present invention, illustrating a joint between the lower end of the protective part and the internal wall.

As illustrated in FIGS. 1, 2, and 3, one solution of the present invention is a reforming tube 1 comprising:
- a cavity 2 emerging on either side of the tube,
- an external wall,
- an internal wall 3,
- a part 4 for protecting against corrosion inserted into the cavity mirroring at least a portion of the internal wall,
- a space between the internal wall and the protective part, and
- a refractory material 5 which fills in said space between the internal wall and the protective part.

As the case may be, the reforming tube according to the present invention can exhibit one or more of the following characteristics:
- the refractory material 5 matches the shape of the internal wall and the shape of the protective part;

the refractory material 5 is chosen from: ceramic fiber fabrics, ceramic fiber paper, refractory ceramic fibers and polycrystalline ceramic fibers;

said tube comprises a joint 6 between the upper end of the protective part and the internal wall;

said tube comprises a joint 7 between the lower end of the protective part and the internal wall;

at least one joint 6 or 7 is a soldered joint, a brazed joint or a joint produced with glass or glass-ceramic;

the protective part 4 comprises a material which is inert with regard to corrosion by metal dusting;

the material of the protective part is chosen from alloys based on nickel and on chromium; mention may be made, by way of example, of the 601, 617, 690 and 693 commercial alloys;

the material of the protective part 4 is made of ceramic or exhibits a coating made of ceramic; preferably, the part 4 for protecting against corrosion comprises a material exhibiting a low resistance to corrosion and a coating made of a material exhibiting a very good resistance to corrosion or a coating made of ceramic;

the ceramic can be chosen from $Al_2O_3$, $MgAl_2O_4$, $ZrO_2$, $Y_2O_3$—$ZrO_2$, MgO, MgO—$ZrO_2$, $Al_2O_3$—$ZrO_2$, SiC and $Si_3N_4$.

In other words, the solution provided consists in inserting a protected ceramic or metal part. The constituent material of this protective part is selected as a function of its resistance to corrosion and of its chemical and physical compatibility with the alloy of the tube. The protective part does not adhesively bond to the alloy of the tube, which is very different from the solutions of the prior art. The degree of freedom between the tube and the protective part makes it possible to reduce the mechanical stresses which might be brought about by the thermal expansion of the portions exposed to high temperatures (400-1000° C.).

However, this space between the internal wall of the tube and the protective part might result in a flow of the synthesis gas. Consequently, it is necessary to prevent access of the synthesis gas to this space.

The present invention provides, as main solution to the problem of access of the synthesis gas to said space, the use of a refractory material which fills in said space between the internal wall and the protective part. Preferably, the refractory material fits the shape of the internal wall of the tube. The refractory material must be selected as a function of its ability to withstand a synthesis gas atmosphere ($H_2$, CO, $CH_4$, $H_2O$), at high temperature (800 to 1000° C.), and to be distorted when it is subjected to a limited load in order to be able to fit the shape of the internal wall of the tube and the shape of the wall of the protective part. This deformation (compression) of the refractory material under its own weight and with the impact of the stream of syngas on the conical portion of the part 4 will reduce the flow rate of synthesis gas in the space between the internal wall of the tube and the protective part. It should be noted that refractory ceramic fibers are good candidates for this application.

Two secondary solutions can be added, separately or in combination, to this main solution:

use of a joint between the upper end of the protective part and the internal wall; and/or use of a joint between the lower end of the protective part and the internal wall.

These two secondary solutions make it possible, in the case where the main solution greatly reduces but allows the passage of the gas stream, to obtain, in the space between the internal wall and the protective part, a static synthesis gas, which considerably reduces the rate of corrosion.

It should be noted that the reforming tube according to the invention will preferably be used for the production of hydrogen from synthesis gas.

The solution provided in the context of the invention makes it possible to solve the following problems:

protection against possible corrosion for large surface areas of the reforming tube. Large surface area is understood to mean parts, the dimensions of which make difficult or impossible the application of a protective coating;

the choice of the materials of the protective part and the compatibility with the base alloy is much easier, given that the protective part is not in contact with the internal wall of the reforming tube; and the risks of cracking at the protective part are also reduced as the parts are not integral and can move freely with respect to one another. This makes it possible to maximize the reduction in the stresses at the interface between the parts.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A reforming tube comprising:
   a cavity emerging on either side of the tube,
   an internal wall,
   a protection element for protecting against corrosion inserted into the cavity mirroring at least a portion of the internal wall,
   a space between the internal wall and the protection element, and
   a refractory material which fills in said space between the internal wall and the protection element.

2. The reforming tube of claim 1, wherein the refractory material matches the shape of the internal wall and the shape of the protection element.

3. The reforming tube of claim 1, wherein the refractory material is selected from the group consisting of ceramic fiber fabrics, ceramic fiber paper, refractory ceramic fibers, and polycrystalline ceramic fibers.

4. The reforming tube of claim 1, wherein said tube comprises a joint between the upper end of the protection element and the internal wall.

5. The reforming tube of claim 1, wherein said tube comprises a joint between the lower end of the protection element and the internal wall.

6. The reforming tube of claim 4, wherein at least one joint is a soldered joint, a brazed joint or a joint produced with glass or glass-ceramic.

7. The reforming tube of claim 1, wherein protection element comprises a material which is inert with regard to corrosion by metal dusting.

8. The reforming tube of claim 7, wherein the material of protection element is chosen from alloys based on nickel and on chromium.

9. The reforming tube claim 7, wherein the material of the protection element is made of ceramic or exhibits a coating made of ceramic.

10. The reforming tube of claim 9, wherein the ceramic is selected from the group consisting of $Al_2O_3$, $MgAl_2O_4$, $ZrO_2$, $Y_2O_3$—$ZrO_2$, MgO, MgO—$ZrO_2$, $Al_2O_3$—$ZrO_2$, SiC, and $Si_3N_4$.

11. The use of a reforming tube of claim 1 for the production of hydrogen from synthesis gas.

* * * * *